Patented Feb. 12, 1935

1,990,706

UNITED STATES PATENT OFFICE 1,990,706

PROCESS OF TESTING FOR HALOGENS

Thomas Midgley, Jr., Worthington, Ohio, assignor, by mesne assignments, to General Motors Corporation, a corporation of Delaware Application December 21, 1931, Serial No. 582,339

1 Claim. (Cl. 23—230)

My invention relates to chemistry and more particularly to methods of and apparatus for testing apparatus suspected of leakage. It is especially concerned with methods of and apparatus for testing for leakage in a refrigerating system employing halogen derivatives and especially halo-fluoro derivatives of hydrocarbons as refrigerants.

The objects of my invention are to provide a method of and apparatus for testing for leaks by employing a spark gap having at least one electrode composed of a metal capable of giving a characteristic color when heated in an atmosphere containing a halogen derivative. More particularly, the objects of my invention include a method of and apparatus for conducting to such a spark gap a mixture of air and any escaping halogen derivative from the vicinity of the apparatus to be tested in a way to assure maximum sensitivity in detecting any escaping halogen and to positively indicate the exact point at which the leak is taking place.

My invention is illustrated on the accompanying drawing wherein.

Figure 1:
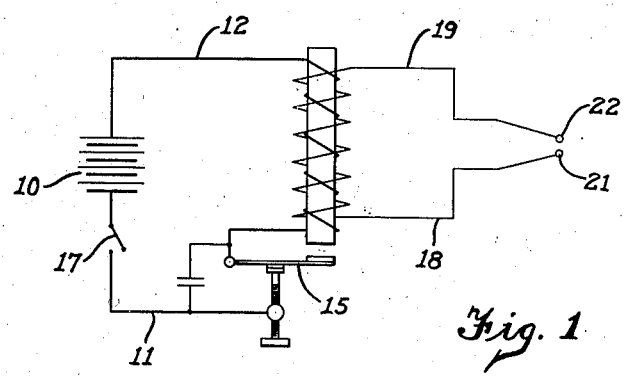
Fig. 1 is a diagrammatic view of one form of apparatus.

In Fig. 1 there is disclosed a spark producing apparatus comprising a battery 10 connected in the usual manner by leads 11 and 12 to one winding 13 of a spark coil. The battery circuit includes the usual make and break device 15 controlled by the solenoid 16 and the usual hand switch 17. High tension wires 18 and 19 are connected to the second winding 20 of the spark coil and terminate in the electrodes 21 and 22 respectively forming the spark gap. At least one of the electrodes 21 and 22, for example electrode 21, is composed of or has incorporated therewith a metal such as copper capable of giving a characteristic test color, as hereinafter described.

In operation, leaks are detected by moving the spark gap about the refrigerating apparatus. The presence of any halogen derivative, such as a halo-fluoro derivative of a hydrocarbon, is indicated by an intense green color imparted to the spark if the electrode is composed of copper.

If desired, the spark may be made to jump from the copper electrode indicated at 21 to the apparatus to be tested, the apparatus being grounded to constitute the second electrode. In this manner the initial cost is reduced and a more accurate test may be had.

Figure 2:
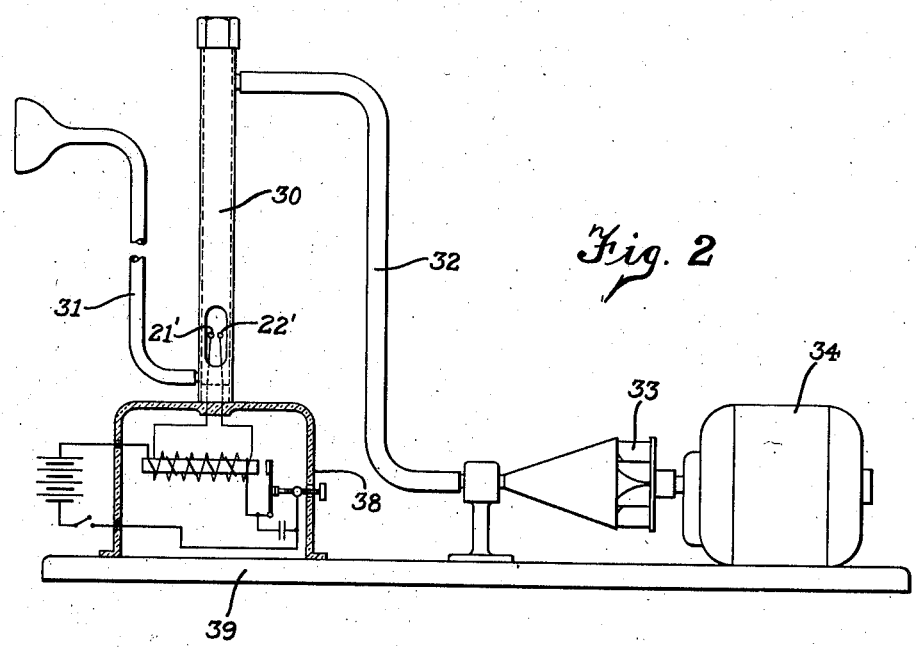
Fig. 2 is a view partly in elevation and partly in section of a second form of apparatus.

Referring to Fig. 2, a slightly modified form of apparatus is disclosed wherein the electrodes 21' and 22', corresponding to the electrodes 21 and 22 of Fig. 1, are located within a chimney 30 provided with an exploring tube 31 at its lower end and with an exhaust conduit 32 at its upper end. There is provided in the exhaust conduit a fan 33 driven by a motor 34 and adapted to withdraw air forcibly through the chimney 30 and the conduit 32. In this modification, the spark producing apparatus generally indicated at B is exactly the same as that disclosed in Fig. 1. It is supported, however, in an insulated support 38 supported on a portable base 39.

In operation the exploring tube 31 is moved slowly about the refrigerating apparatus to withdraw a mixture of air and any leaking refrigerant from the vicinity of the leak into the presence of the spark gap. The presence of any halogen derivative will be indicated by an intense green color imparted to the spark where a copper electrode is used.

In the operation of the apparatus shown on the drawing, the chemical and the physical action appear to be substantially as follows. Any halogen contained in the air upon striking the spark gap and consequently the red hot copper electrode 21 or 21', is decomposed, forming a copper halide which is volatile and which emits light when heated, giving the characteristic spectrum of copper and the intense green color to the flame.

Copper has been mentioned as the metal employed because of its characteristic color test. Other metals and their alloys may be used as electrodes to give other characteristic colors. For other metals and other compounds capable of giving a visible color test and which may become of value when used with my invention, reference is hereby made to the co-pending application of Wheeler B. Lovell, Serial No. 541,093.

Throughout the specification and claims the term metal is intended to include not only the metal itself, but alloys thereof as well.

What is claimed is as follows:

The method of detecting leaks in a closed system containing a halogen derivative which consists in withdrawing escaping halogen derivative from the vicinity of the leak and passing the same through a spark between electrodes, one or both of which contains a metal capable of reacting with a halogen to form a metallic halide, whereby the halogen derivative is decomposed and reacts with the metal to form a volatile halide of distinctive coloration.

THOMAS MIDGLEY, Jr.